US011455434B2

(12) United States Patent
Inagaki et al.

(10) Patent No.: US 11,455,434 B2
(45) Date of Patent: Sep. 27, 2022

(54) INPUT AND OUTPUT DEVICE AND AUTOMATIC TRANSACTION APPARATUS

(71) Applicant: Hitachi-Omron Terminal Solutions, Corp., Tokyo (JP)

(72) Inventors: Hideto Inagaki, Tokyo (JP); Noriaki Fujimura, Tokyo (JP)

(73) Assignee: HITACHI CHANNEL SOLUTIONS, CORP., Tokyo (JP)

( * ) Notice: Subject to any disclaimer, the term of this patent is extended or adjusted under 35 U.S.C. 154(b) by 79 days.

(21) Appl. No.: 16/457,325

(22) Filed: Jun. 28, 2019

(65) Prior Publication Data

US 2020/0134239 A1 Apr. 30, 2020

(30) Foreign Application Priority Data

Oct. 25, 2018 (JP) .............................. JP2018-200454

(51) Int. Cl.
*G06F 21/84* (2013.01)
*G06F 3/01* (2006.01)
*G06F 3/042* (2006.01)

(52) U.S. Cl.
CPC .............. *G06F 21/84* (2013.01); *G06F 3/012* (2013.01); *G06F 3/0426* (2013.01)

(58) Field of Classification Search
CPC ......... G06F 21/84; G06F 3/012; G06F 3/0426
See application file for complete search history.

(56) References Cited

U.S. PATENT DOCUMENTS

| 6,031,519 A * | 2/2000 | O'Brien | G06F 3/0482 345/157 |
| 10,275,098 B1 * | 4/2019 | Clements | G02B 30/56 |
| 2011/0316828 A1 * | 12/2011 | Shirbabadi | G07F 19/205 345/207 |
| 2014/0214672 A1 * | 7/2014 | Luo | G07F 19/207 705/44 |
| 2015/0130636 A1 * | 5/2015 | Bowling | H04Q 9/00 340/870.09 |
| 2016/0018985 A1 * | 1/2016 | Bennet | G06F 3/011 345/175 |
| 2019/0235643 A1 | 8/2019 | Kuribayashi | |

FOREIGN PATENT DOCUMENTS

| CN | 101101383 A | 1/2008 |
| CN | 103942875 A | 7/2014 |
| CN | 107193125 A | 9/2017 |
| CN | 107408372 A | 11/2017 |
| CN | 108267862 A | 7/2018 |

(Continued)

OTHER PUBLICATIONS

Office Action issued in corresponding Chinese Patent Application No. 201910571734.8 dated Apr. 6, 2021 with English translation.

(Continued)

*Primary Examiner* — Sherrod L Keaton
(74) *Attorney, Agent, or Firm* — Foley & Lardner LLP (57) ABSTRACT

A display unit is present in a space different from an input and output screen displayed in a three-dimensional space, and a control unit displays the input and output screen as an optical image formation of light progressing in a direction of a user so that no one other than the user is able to photograph the input and output screen.

7 Claims, 5 Drawing Sheets

(56) References Cited

FOREIGN PATENT DOCUMENTS

| | | |
|---|---|---|
| JP | 2000-251132 A1 | 9/2000 |
| JP | 2008-089984 A | 4/2008 |
| JP | 2011-257991 A1 | 12/2011 |
| JP | 2016-119095 A1 | 6/2016 |
| JP | 2017-62709 A | 3/2017 |
| KR | 20150112298 A * | 3/2014 |
| KR | 20150112298 A * | 10/2015 |
| WO | WO-2018/003862 A | 1/2018 |

OTHER PUBLICATIONS

Office Action issued in corresponding Chinese Patent Application No. 201910571734.8 dated Sep. 28, 2021.
Office Action issued in corresponding JP Patent Application No. 2018-200454 dated Jun. 14, 2022 (10 pages).

* cited by examiner

INPUT AND OUTPUT DEVICE AND AUTOMATIC TRANSACTION APPARATUS

BACKGROUND OF THE INVENTION

1. Field of the Invention

The present invention relates to an input and output device and an automatic transaction apparatus.

2. Description of the Related Art

In recent years, communication means without a real image has become widespread in a form of virtual reality or augmented reality.

For example, as described in JP 2017-62709 A, an input device using an aerial image as an input interface is being put to practical use by an advance of an aerial image formation technology.

On the other hand, for a password input device for a purpose of inputting confidential information such as a password input, an improvement is constantly being progressed so as to take means to counter a criminal action due to confidential information defraudation.

SUMMARY OF THE INVENTION

It is general that a current password input device also uses a peep prevention cover or the like for a purpose of preventing input defraudation. However, on the other hand, by installing a camera on a peep prevention cover, a crime of defrauding a password has occurred.

In addition, by sticking a film having a data acquisition function imitating a keyboard on a keyboard surface of a password input device, a crime of defrauding a password has occurred.

It is conceivable to use an input device using an aerial image as described in JP 2017-62709 A as an input interface as means for countering a criminal action due to such confidential information defraudation.

However, J P 2017-62709 A has a function as a simple input and output interface, but does not have a function of protecting confidential information in a case in which input information is the confidential information such as a password input. Therefore, J P 2017-62709 A is lacking in security to put JP 2017-62709 A to practical use as a device that handles confidential information such as a password input or a signature.

An object of the present invention is to protect a confidential information device such as an input password input in an input and output device that displays and outputs an aerial image to use the aerial image as an input interface.

An input and output device of an aspect of the present invention includes a display unit that displays a predetermined image, an image formation mechanism unit that causes the image displayed on the display unit to be formed in air as an input and output screen by projecting the image on a three-dimensional space visible to a user, and a control unit that performs predetermined control. The display unit is present in a space different from the input and output screen displayed in the three-dimensional space, and the control unit displays the input and output screen as an optical image formation of light progressing in a direction of the user so that no one other than the user is able to photograph the input and output screen.

According to an aspect of the present invention, it is possible to protect a confidential information device such as an input password input in an input and output device that displays and outputs an aerial image to use the aerial image as an input interface.

DETAILED DESCRIPTION OF THE PREFERRED EMBODIMENTS

Hereinafter, embodiments will be described with reference to the drawings.

Embodiment 1

A configuration of an input and output device of Embodiment 1 will be described with reference to FIGS. 1 and 2.

Embodiment 1 relates to an input and output device that handles an input of confidential information using an input interface using an aerial image.

Figure 1:
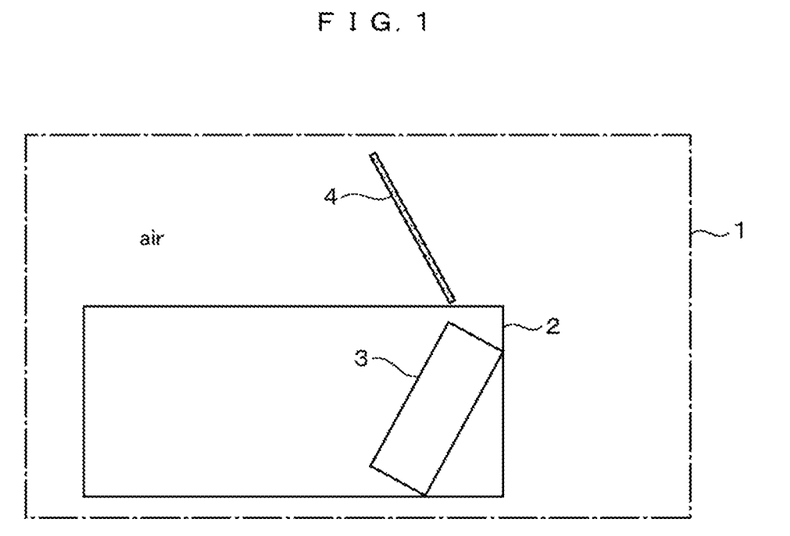
FIG. 1 is a diagram illustrating a configuration of an input and output device of Embodiment 1.

As illustrated in FIG. 1, an input and output device 1 includes an image formation mechanism unit 2, an input and output unit main body 3, and an input and output screen 4 of which an image is formed in air.

The image formation mechanism unit 2 has a function of causing an image of a light source of an image displayed on the input and output unit main body 3 to be formed in the air as the input and output screen 4 using reflection and transmission of light. The image displayed on the input and output screen 4 is equivalent to the image displayed on the input and output unit main body 3. A user operates the input and output screen 4 of which the image is formed in the air to input information. An input interface for the user of the input and output device 1 is the input and output screen 4, but the input operation on the input and output screen 4 of which the image is formed in the air is equivalent to inputting by directly operating the input and output unit main body 3. Furthermore, the input and output unit main body 3 has a destruction detection function and has a function of protecting confidential information.

A configuration of the input and output unit main body 3 will be described with reference to FIG. 2.

Figure 2:
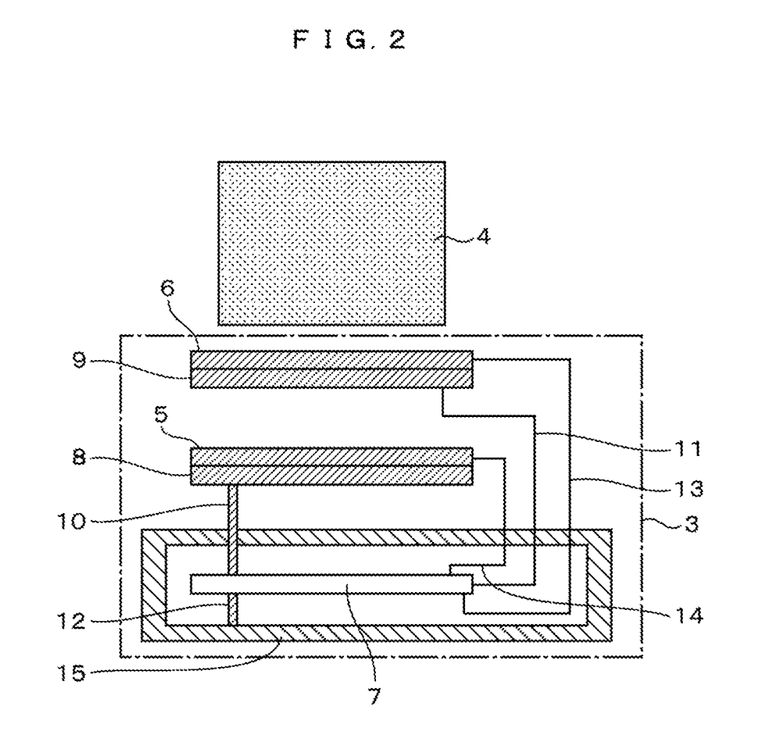
FIG. 2 is a diagram illustrating details of a side section of an input unit main body.

As illustrated in FIG. 2, the input and output unit main body 3 includes a display unit 5, an input detection sensor 6, and a control unit 7. The display unit 5 displays the image equivalent to the input and output screen 4 of which the image is to be formed in the air. The input detection sensor 6 detects an air operation on the input and output screen 4.

A conductive material 8 represented by a sheet metal is disposed in the display unit 5 and is connected to the control unit 7 by a conductive medium 10 represented by a wire and a conductive rubber. Furthermore, the display unit 5 is connected to the control unit 7 by an image signal line 14 and displays an image of the display unit 5 as the input and output screen 4.

A conductive material 9 represented by a sheet metal is disposed in the input detection sensor 6 and is connected to the control unit 7 by a conductive medium 11 represented by a wire and a conductive rubber. Furthermore, the input detection sensor 6 is connected to the control unit 7 by a signal line 13.

The input detection sensor 6 is mounted inside the input and output unit main body 3. In a case in which the display unit 5, the input detection sensor 6, or both of the display unit 5 and the input detection sensor 6 are not in contact with the conductive material 8 and the conductive material 9, or in a case in which a connection between the display unit 5, the input detection sensor 6, or both of the display unit 5 and the input detection sensor 6 and the conductive medium 10 and the conductive medium 11 is disconnected, the control unit 7 detects that the display unit 5 or the input detection sensor 6 is removed. In addition, the control unit 7 recognizes that a destruction action on the input and output unit main body 3 has occurred, and has a function of erasing internal confidential information. Here, in FIG. 2, although the input detection sensor 6 is mounted inside the input and output unit main body 3, the input detection sensor 6 may be mounted outside the input and output unit main body 3.

In addition, the control unit 7 is covered by a protection mechanism 15 in which electric signal lines are attached in a mesh shape. The control unit 7 and the protection mechanism 15 are connected with each other by a conductive medium 12. In addition, in a case in which the protection mechanism 15 is removed or the electric signal line of mesh shape is disconnected, the control unit 7 recognizes that the destruction action on the input and output unit main body 3 has occurred, and erases the internal confidential information.

The control unit 7 displays a current image of the input and output screen 4 on the display unit 5 and updates a display content of the display unit 5 on the basis of an input signal from the input detection sensor 6. In addition, the control unit 7 has a function of detecting the destruction action and erasing the internal confidential information, and also has a communication function with the outside.

Embodiment 2

A configuration of the input and output device of Embodiment 2 will be described with reference to FIGS. 3A, 3B, and 4. Embodiment 2 is for forming the image of the input and output screen 4 at an optimum position with respect to the user.

Figure 3A:
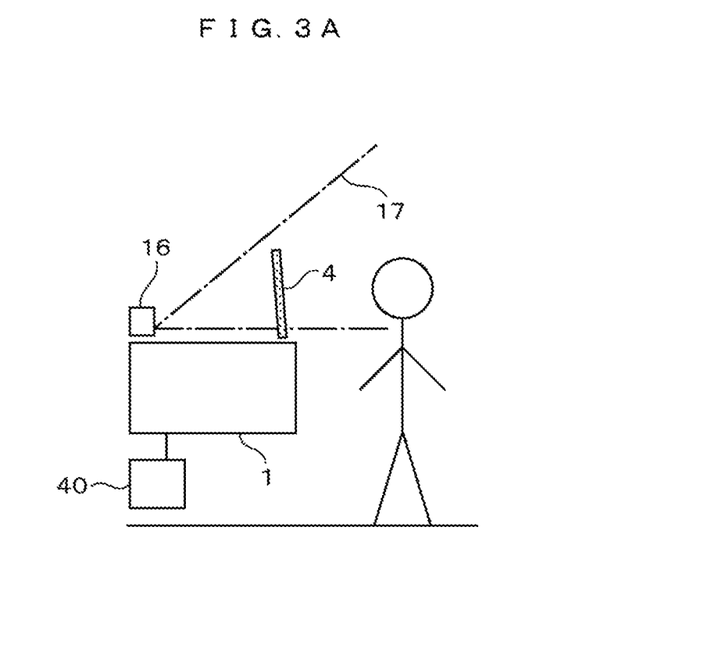
FIG. 3A is a diagram illustrating a configuration of an input and output device of Embodiment 2.

As illustrated in FIG. 3A, the input and output device 1 is equipped with a detection device 16 capable of detecting a face or detecting a line of sight. Furthermore, as illustrated in FIGS. 3A and 3B, the input and output device 1 includes a rotation mechanism 40 that rotates the input and output device 1 so that the position where the image of the input and output screen 4 is formed is directed to the face of the user, on the basis of a result that the detection device 16 detects the face or the line of sight of the user.

In a detection range 17 of the detection device 16, in a case in which a height of the user is low or high, depending on a case in which the user is standing rightward or leftward with respect to the input and output screen 4, the input and output device 1 and the input and output screen 4 change a direction so as to direct to the position of the face of the user. By the rotation mechanism 40, the input and output screen 4 can be always displayed in an optimal state with respect to the user, and the input and output device 1 that is visible to only the user can be realized.

Figure 3B:
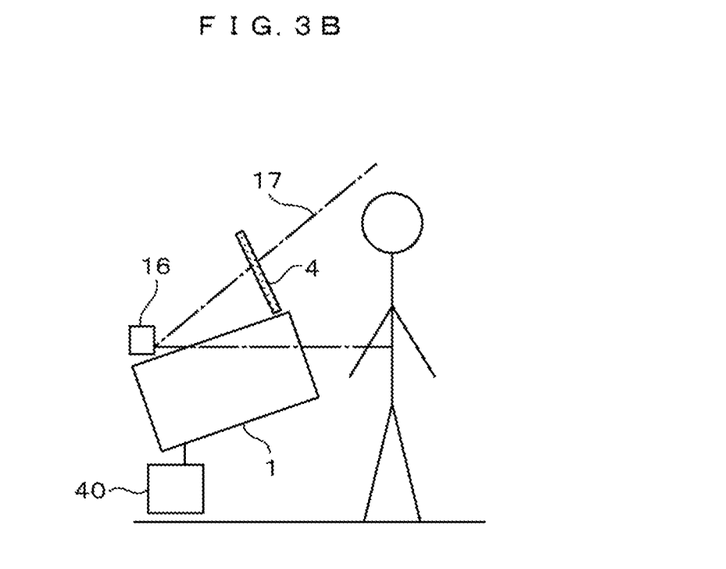
FIG. 3B is a diagram illustrating the configuration of the input and output device of Embodiment 2.

FIGS. 3A and 3B illustrate a state in which the image formation position is changed in a vertical direction by a height difference of the user as an example in which the input and output screen 4 changes the direction. With the same configuration, it is also possible to change the image formation direction in a horizontal direction in accordance with a standing position of the user.

Figure 4:
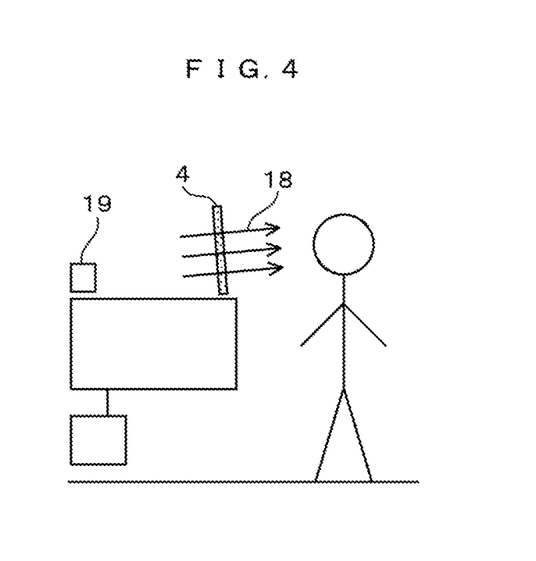
FIG. 4 is a diagram illustrating another configuration of the input and output device of Embodiment 2.

FIG. 4 illustrates an example in which a camera 19 is used in the detection device 16 illustrated in FIG. 3.

As illustrated in FIG. 4, since light forming the image of the input and output screen 4 progresses like light beam 18, the light beam 18 does not reach the camera 19 installed at a rear of the input and output screen 4 and the input and output screen 4 is not captured by the camera 19. Therefore, the camera 19 can photograph the user from the rear of the input and output screen 4 without being affected by the input and output screen 4.

Embodiment 3

Figure 5:
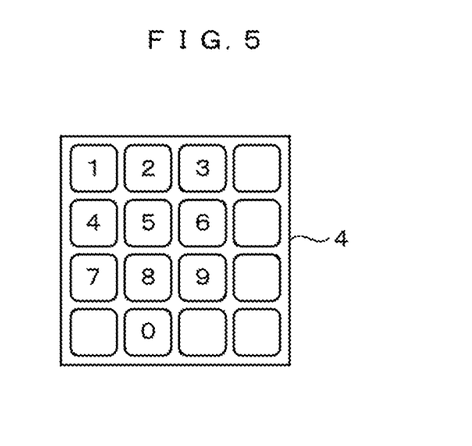
FIG. 5 is a diagram illustrating an example of a general keyboard arrangement.
Figure 6:
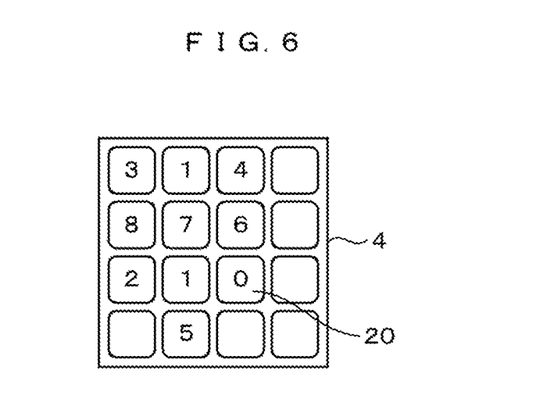
FIG. 6 is a diagram illustrating an example of a password input key arrangement.
Figure 7A:
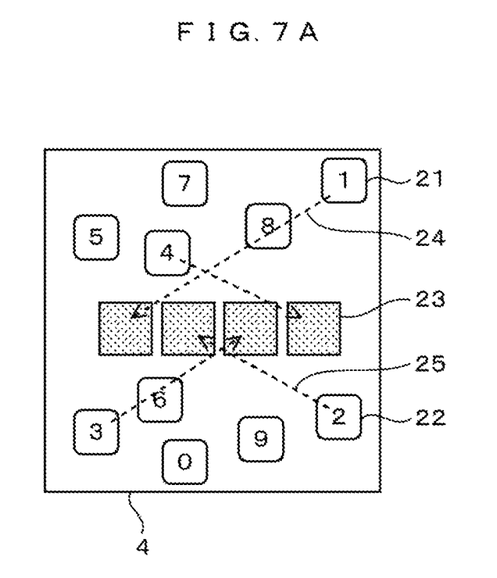
FIG. 7A is a diagram illustrating another example of the password input key arrangement.
Figure 7B:
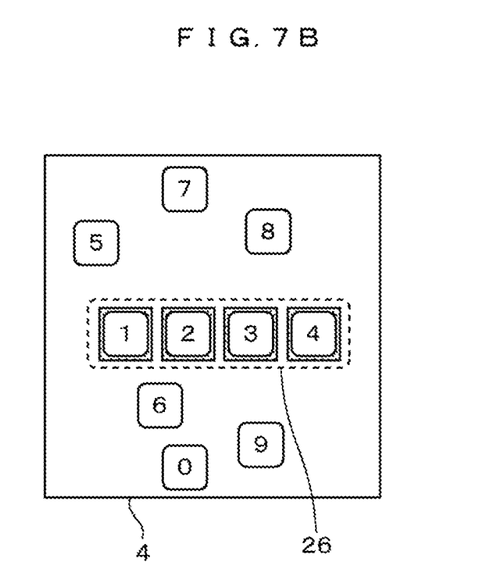
FIG. 7B is a diagram illustrating another example of the password input key arrangement.

The configuration of the input and output device of Embodiment 3 will be described with reference to FIGS. 5, 6, 7A, and 7B. FIG. 5 illustrates an example of a general keyboard arrangement as a password input device. FIGS. 6, 7A, and 7B illustrate an example in which it is difficult to infer confidential information by photographing a movement of a hand operated by the user on the input and output screen 4 and security of the confidential information input is further improved.

FIG. 6 illustrates the arrangement of the keyboard arrangement illustrated in FIG. 5 with respect to the input and output screen 4 changed to a password input key 20. The arrangement can be changed randomly for each display in the input and output screen 4.

FIG. 7A is configured of randomly disposed password input keys 21 and 22 and a password display unit 23 in the input and output screen 4. By sliding the password input key 21, the password input key 21 is moved to the password display unit 23 as in a movement 24. Similarly, by sliding the password input key 22, the password input key 22 is moved to the password display unit 23 as in a movement 25.

As illustrated in FIG. 7B, by repeatedly moving the password input keys 21 and 22 in accordance with the number of digits of a password, a password 26 is determined. In addition, each of the password input keys 21 and 22 displayed in the input and output screen 4 can be changed randomly at each display.

Embodiment 4

Figure 8:
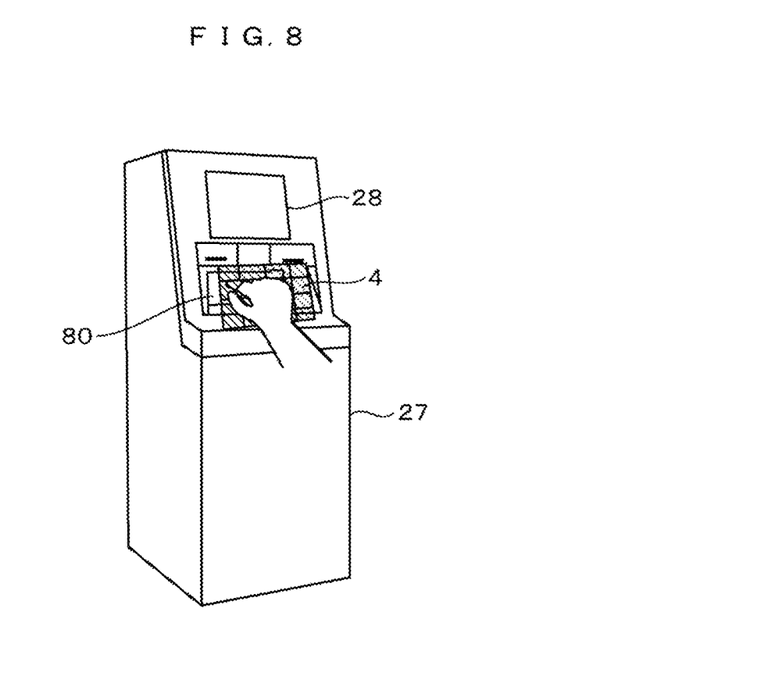
FIG. 8 is a diagram illustrating an example of an input and output device applied to an automatic teller machine.

FIG. 8 illustrates an example in which the input and output devices of Embodiments 1 to 3 are applied to an automatic teller machine.

The input and output screen 4 is disposed on a user operation unit 80 of an automatic teller machine 27. Separately from the input and output screen 4, a main display screen 28 is also used, and an operation menu or an announcement is displayed on the main display screen 28. The operation menu or the announcement can be displayed on the input and output screen 4 only when confidential information is input or displayed.

In addition, operations of inserting and removing a bill, a card, and a statement slip to the automatic teller machine including deposit and withdrawal of the bill can be operated through a bill opening, a statement slip opening, and a card opening penetrating the input and output screen 4 even in a state in which the input and output screen 4 is displayed.

Embodiment 5

Figure 9:
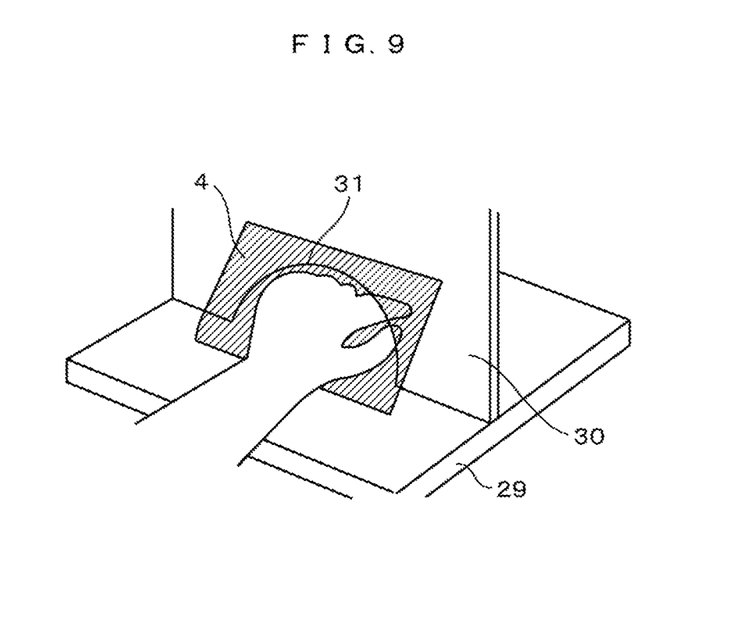
FIG. 9 is a diagram illustrating an example of an input and output device applied to a customer service counter.

FIG. 9 illustrates an example in which the input and output devices 1 of Embodiments 1 to 3 are applied to a manned customer service counter.

As an example, at a lottery ticket issue and winning exchange counter, a partition plate 30 with a medium transfer port 31 is installed at a reception counter 29. Therefore, it is common to separate a user and an attendant by a medium transferable partition.

Furthermore, an apparatus for input and output to the user is installed by avoiding the medium transfer port 31 so as not to disturb the medium transfer. Therefore, also from a viewpoint of prevention of a peep, it is general that display related to a large amount winning is not clearly displayed at the time of the winning exchange of the lottery.

By projecting and superimposing the input and output screen 4 of the input and output devices 1 of Embodiments 1 to 3 on and with the medium transfer port 31 to the counter of such a form, information related to the large amount winning cannot be visually recognized by anyone other than the user. As a result, medium transferring with the attendant is also possible by penetrating the input and output screen 4 and using the medium transfer port 31.

As described above, according to the embodiments, since an actual state of the input and output screen is not present by realizing the input and output device by the aerial image formation, a film imitating a keyboard cannot be pasted. In addition, since the aerial image is formed only in the progress direction of the light, the aerial image cannot be visually recognized from a direction other than the progress direction of the light. By utilizing this characteristic to detect the position of the user and having a mechanism in which the image formation position is always in front of the user, the peep prevention cover becomes unnecessary. In addition, since the photographing cannot be performed only from the progress direction of the light, the camera for defraudation purpose installed on an upper side or a side surface of the input and output device can be made ineffective.

In addition, by providing the destruction detection function to the input and output device that projects the aerial image, it becomes extremely difficult to defraud input data.

Furthermore, it is conceivable that even though the input and output screen cannot be photographed, the inference of the password is possible by photographing the movement of the hand in the air of the user. Therefore, it is possible to prevent the inference of the confidential information due to the movement of the hand by changing the display position of an alphanumeric character displayed on the input and output screen and words for assisting the input.

As described above, according to the embodiments, it is difficult to defraud the input confidential information from the input and output device. As a result, security of the input of the confidential information can be improved, and convenience as the input and output device is improved by applying the aerial image formation.

What is claimed is:
1. An input and output device comprising:
a display unit that displays a predetermined image;
an image formation mechanism unit that causes the image displayed on the display unit to be formed in air as an input and output screen by projecting the image on a three-dimensional space visible to a user;
a control unit that performs predetermined control; and
a destruction action detector, the destruction action detector comprising
a first conductive material disposed in the display unit,
a first conductive medium that connects the first conductive material to the control unit,
a second conductive material disposed in an input detection sensor,
a second conductive medium that connects the second conductive material to the control unit,
a protection mechanism that covers the control unit and includes signal lines attached in a mesh shape, and
a third conductive medium that connects the protection mechanism to the control unit,
wherein the detector is configured to detect a destruction action that is at least one of
the display unit being removed from the first conductive material or disconnected from the first conductive medium,
the input detection sensor being removed from the second conductive material or disconnected from the second conductive medium,
the protection mechanism being removed from the control unit, or
the signal lines of mesh shape being disconnected,
wherein the control unit, in response to detecting the destruction action, automatically erases confidential information stored in an inside in a case in which the destruction action detector detects the destruction action,
wherein the display unit is present in a space different from the input and output screen displayed in the three-dimensional space, and
wherein the control unit displays the input and output screen as an optical image formation of light progressing in a direction of the user so that a position of the optical image formation remains fixed relative to the user so as to be in front of the user when the user faces the display unit, and no one other than the user is able to photograph the input and output screen.
2. The input and output device according to claim 1,
wherein the input detection sensor detects an air operation to the input and output screen by the user,
wherein the control unit displays a current image of the input and output screen on the display unit, and updates a display content of the display unit on the basis of an input signal from the input detection sensor.
3. The input and output device according to claim 1, wherein, in a case in which the connection between the protection mechanism and the third conductive medium is disconnected, the control unit determines that the protection mechanism is removed, and in a case in which the destruction action is detected, the control unit automatically erases the confidential information stored in the inside as correspondence to the detection of the destruction action.
4. The input and output device according to claim 1, further comprising:
a detection device that detects a face of the user; and
a rotation mechanism that rotates the input and output device so that an image formation position of the input and output screen is directed to the face of the user, on the basis of the face of the user that is detected by the detection device.

5. The input and output device according to claim 1, further comprising:
a camera disposed at a rear of the input and output screen and photographing the user from the rear of the input and output screen without being affected by the input and output screen.

6. The input and output device according to claim 1, further comprising:
an automatic transaction device that performs a transaction according to an input of password information of the user, the automatic transaction device comprising a user operation unit disposed on a rear side of the input and output screen displayed in the air, wherein
the input and output screen has a keyboard arrangement for inputting the password information, an arrangement of the keyboard arrangement is able to be randomly changed for each display in the input and output screen with respect to the input and output screen, and
operations of inserting and extracting a bill, a card, and a statement slip are possible through a bill opening, a statement slip opening, and a card opening by penetrating the input and output screen, on a state in which the input and output screen is displayed in the air.

7. The input and output device of claim 6, wherein the image formation position is adjusted in a vertical direction according to a height of the user.

\* \* \* \* \*